UNITED STATES PATENT OFFICE.

HENRY V. DUNHAM, OF BAINBRIDGE, NEW YORK, ASSIGNOR TO HALL MOTOR FUEL, LIMITED, OF LONDON, ENGLAND, A CORPORATION.

PROCESS OF MAKING PARAFFINUM LIQUIDUM.

1,240,792. Specification of Letters Patent. Patented Sept. 18, 1917.

No Drawing. Application filed March 16, 1916. Serial No. 84,682.

*To all whom it may concern:*

Be it known that I, HENRY V. DUNHAM, a citizen of the United States, residing at Bainbridge, in the county of Chenango and State of New York, have invented certain new and useful Improvements in Processes of Making Paraffinum Liquidum, of which the following is a specification.

The present invention relates to the production of paraffinum liquidum from lubricating oils by a chemical treatment of the said oils, in such a manner as to produce a product of a sufficient grade of purity, to satisfy the requirements of the pharmacopœia, whereby a product, preferably clear and bright can be secured, for example from a lubricating oil or cylinder oil of ordinary character.

In carrying out my process I preferably proceed as follows. To a suitable cylinder or lubricating oil I add sulfuric acid in any approved manner, the amount of acid used depending to a considerable extent upon the grade and purity of the particular oil under treatment. This acid may be added in several amounts if so desired, and after agitation with the oil, the sludge may be removed after each addition, in a manner well known in the art of treating mineral oils. After the removal of the last acid sludge, I treat the oil with a material capable of neutralizing the small amounts of sulfonic acids and other acid compounds retained by said oil, in such a manner as not to produce an undesirable emulsification of any material amount of the oil. After removal of the product produced by neutralizing the acidity of the oil, I then dry the oil in any suitable manner, and filter the same through a suitable clarifying and decolorizing agent.

As a specific example of the process, to which the invention is not limited, the following is given. To a suitable cylinder or lubricating mineral oil distillate, (for example a petroleum cylinder oil having a specific gravity of .902 to .905 being a well known lubricating oil of high viscosity) I add sulfuric acid, preferably in five instalments. To 1000 gallons of the oil I add in all, approximately an equal weight of sulfuric acid. In doing this it is preferable to start in by adding 1440 pounds of sulfuric acid of about 1.84 specific gravity. This is agitated with the oil in the usual manner, and after allowing to settle, the sludge is removed. I then add about the same amount of a somewhat stronger acid, for example an acid containing 4 or 5% of free anhydrid, agitate, settle and draw off the sludge as before. I then continue the successive treatments, preferably using acid of higher strength in each successive treatment, until the final or fifth treatment is with an acid of about 1.935 gravity and containing approximately 25% of free anhydrid.

The oily product after settling at this stage, is a dark colored oil, which is impure, which contains acid products, sulfur dioxid, sulfuric acid, sulfonic acids. The product may have a decidedly disagreeable and penetrating odor, and ordinarily is a sticky, brownish, thick, viscous, oily, strongly colored non-transparent liquid.

After removal of the last acid sludge, I add about 100 gallons of an ammoniacal alcohol solution containing for example 1 volume of aqueous ammonia, of about .89 gravity (containing about 31% $NH_3$) and 2 volumes of alcohol (which may be grain alcohol of about 95%, although other alcohols can be used. The particular proportions of ammonia and alcohol may be varied more or less depending upon the nature of the particular oil treated. This mixture is then stirred thoroughly, during which time a reaction takes place between the ammonia and the acid compounds contained in the oil, and a thick somewhat tarry appearing, brownish, gummy, viscous material is produced. This is allowed to settle for about three hours, during which time substantially the entire amount of the brownish material separates out, leaving a yellowish, oily liquid which may be entirely clear, or may be more or less cloudy, the amount of cloudiness depending upon the amount of moisture contained therein. This material is then dried in any suitable manner, for example by passing a current of hot, dry air through the oil.

The oil is then filtered through a column of fullers' earth, and on account of the substantially complete removal of the sulfoacid compounds and water, will filter through fullers' earth very readily. The filtered oil comes out perfectly clear, water-white, odorless, substantially tasteless, sulfur-free and is of a sufficient grade of purity to meet the requirements of the pharmacopœia.

The treatment of the oil with acid may be effected by thoroughly mixing the two together, whereby considerable heat will ordinarily be generated. The treatment of the oil with the solution of alcohol and ammonia may be at ordinary room temperature, it not being necessary to heat the oil or the alcohol-ammonia mixture during this step. The drying and the filtration of the oil will both preferably be effected while the oil is in a more or less heated condition, since the drying and the filtration both take place much more efficiently when the material is warm.

In the step of removing the sulfonic compounds from the sludge-free oil, as above stated, I employ a solution of ammonia and alcohol. A solution of fixed alkali and alcohol, for example a solution of caustic soda or caustic potash in dilute alcohol will not produce the same result, but will produce a material which does not filter readily through the fullers' earth. Accordingly I disclaim the use of fixed alkali in the neutralization step, and employ ammonia only, as the alkali.

What I claim is:—

1. In a process of refining oils to produce paraffinum liquidum, the step which comprises mixing with such oils, after treatment with acid and removal of sludge, a liquid comprising ammonia and alcohol, and thereafter allowing the mass to settle.

2. In a process of refining lubricating oils to produce paraffinum liquidum, the step which comprises mixing with such oils, after treatment with acid and removal of sludge, a liquid comprising ammonia and alcohol, and thereafter allowing the mass to settle.

3. A process of treating heavy lubricating oils which comprises subjecting the said oils to treatment with relatively large amounts of sulfuric acid, removing the sludge, treating the residual oil with a reagent comprising ammonia and alcohol, drying the oil and decolorizing the same.

4. A process of treating cylinder oil to produce paraffinum liquidum which comprises subjecting the oil to the action of a relatively large amount of sulfuric acid, removing the sludge, treating the residual oil with a mixture comprising ammonia and alcohol, settling and removing the separated matter, drying the oil by passing therethrough a current of heated, dry, elastic fluid incapable of chemically reacting upon the oil, and thereafter filtering the oil through a column of fullers' earth.

5. A process of treating a cylinder oil of a gravity of about .902 to .905, by treating 1000 parts by volume of the same in a plurality of successive steps, with sulfuric acid in amount substantially equal to the weight of the oil treated, removing the sludge after each of said successive treatments, adding to the residual oil, at substantially atmospheric temperature, about 100 parts by volume of a mixture of 1 volume of strong ammonia water and 2 volumes of strong alcohol, agitating the mixture and allowing the same to settle, removing the separated matter, drying the oil by passing a heated current of air therethrough, and thereafter filtering the oil through a column of fullers' earth.

6. The process which comprises treating heavy viscous hydrocarbon lubricating oil with a large quantity of sulfuric acid, separating the sludge therefrom, adding to the sludge-freed oil an aqueous solution of alcohol and ammonia, and removing the reaction products from the so-treated oil.

In testimony whereof I have affixed my signature.

HENRY V. DUNHAM.